(12) United States Patent
Chong

(10) Patent No.: US 7,352,783 B2
(45) Date of Patent: Apr. 1, 2008

(54) TUNABLE FIBER LASER LIGHT SOURCE

(75) Inventor: Changho Chong, Kasugai (JP)

(73) Assignee: Santec Corporation, Komaki (JP)

( * ) Notice: Subject to any disclaimer, the term of this patent is extended or adjusted under 35 U.S.C. 154(b) by 214 days.

(21) Appl. No.: 11/060,766

(22) Filed: Feb. 18, 2005

(65) Prior Publication Data
US 2006/0056464 A1   Mar. 16, 2006

(30) Foreign Application Priority Data
Sep. 10, 2004   (JP) ............................. 2004-264396

(51) Int. Cl.
- *H01S 3/10*   (2006.01)
- *H01S 3/30*   (2006.01)
- *H01S 3/123*  (2006.01)
- *H01S 3/08*   (2006.01)

(52) U.S. Cl. .................. 372/20; 372/6; 372/15; 372/24; 372/100; 372/102

(58) Field of Classification Search ................ 732/20, 732/24; 372/20, 21, 24, 6, 15, 100, 102
See application file for complete search history.

(56) References Cited

U.S. PATENT DOCUMENTS

| | | | | |
|---|---|---|---|---|
| 4,513,422 A | * | 4/1985 | Buholz | 372/29.011 |
| 4,868,834 A | * | 9/1989 | Fox et al. | 372/20 |
| 4,972,429 A | * | 11/1990 | Herbst | 372/100 |
| 5,226,050 A | * | 7/1993 | Burghardt | 372/20 |
| 5,646,774 A | * | 7/1997 | Takara et al. | 359/340 |
| 5,818,585 A | * | 10/1998 | Davis et al. | 356/477 |
| H1813 H | * | 11/1999 | Kersey | 372/94 |
| 5,978,409 A | * | 11/1999 | Das et al. | 372/100 |
| 6,160,826 A | | 12/2000 | Swanson et al. | |
| 6,192,064 B1 | * | 2/2001 | Algots et al. | 372/99 |
| 6,240,110 B1 | * | 5/2001 | Ershov | 372/20 |
| 6,424,666 B1 | * | 7/2002 | Stamm | 372/32 |
| 6,507,597 B1 | * | 1/2003 | Graindorge et al. | 372/102 |
| 6,590,910 B2 | * | 7/2003 | Lin | 372/18 |

(Continued)

FOREIGN PATENT DOCUMENTS

EP   0347213 A   12/1989

OTHER PUBLICATIONS

Yamashita, S. et al., Widely Tunable Erbium-Doped Fiber Ring Laser Covering Both C-Band and L-Band, IEEE Journal on Selected Topics in Quantum Electronics, Jan./Feb. 2001, pp. 41-43, vol. 7, No. 1.

*Primary Examiner*—Minsun Oh Harve
*Assistant Examiner*—Phillip Nguyen
(74) *Attorney, Agent, or Firm*—Smith Patent Office

(57) ABSTRACT

A loop is formed with an optical fiber by providing a gain medium having a gain with respect to an oscillation wavelength. Light retrieved by the optical circulator 13 from the optical fiber loop is enlarged and projected to a mirror 23. A diffraction grating 25 is provided with respect to the light reflected in the mirror. The diffraction grating 25 has a Littrow arrangemnt wherein the light is reflected in a same direction as incident light. A selected wavelength is changed in accordance with an incident angle with respect to the diffraction grating 25. Therefore, when the mirror 23 is rotated so as to change the selected wavelength, the oscillation wavelength can be changed at high speed.

14 Claims, 13 Drawing Sheets

U.S. PATENT DOCUMENTS

| | | |
|---|---|---|
| 6,614,828 B1 * | 9/2003 | Basting et al. ............... 372/100 |
| 6,738,410 B2 * | 5/2004 | Partlo et al. ................. 372/100 |
| 6,810,047 B2 * | 10/2004 | Oh et al. ...................... 372/20 |
| 6,845,108 B1 * | 1/2005 | Liu et al. ...................... 372/20 |
| 6,901,174 B2 * | 5/2005 | Gupta ............................ 385/1 |
| 6,907,052 B2 * | 6/2005 | Kozlowski et al. .... 372/29.011 |
| 2003/0007523 A1 * | 1/2003 | Chapman et al. .............. 372/20 |
| 2003/0063837 A1 * | 4/2003 | Gupta et al. ................... 385/15 |
| 2004/0125374 A1 * | 7/2004 | Berger et al. ................ 356/364 |
| 2004/0136074 A1 * | 7/2004 | Ford et al. ................... 359/572 |
| 2005/0035295 A1 | 2/2005 | Bouma et al. |
| 2005/0163172 A1 * | 7/2005 | Sacher et al. .................. 372/20 |

* cited by examiner

FIG. 6

| | | | | |
|---|---|---|---|---|
| $\alpha$ | ° | 30.0 | 30.0 | 30.0 |
| $\theta$ | ° | 55.0 | 57.5 | 60.0 |
| $\phi$ | ° | 34.129 | 35.287 | 36.382 |
| $\mu$ | ° | −4.129 | −5.287 | −6.382 |
| $\nu$ | ° | −6.035 | −7.731 | −9.340 |
| $\beta$ | ° | 68.000 | 68.000 | 68.000 |
| $\beta+\nu$ | ° | 61.97 | 60.27 | 58.66 |
| $M_2$ | | 1.439 | 1.512 | 1.599 |
| a | lines/mm | 1100 | 1100 | 1100 |
| $W_2$ | m | 0.00060 | 0.00060 | 0.00060 |
| $W_3$ | m | 0.00086 | 0.00091 | 0.00096 |
| $\lambda$ | nm | 1604.841 | 1578.846 | 1552.902 |
| $\Delta f$ | GHz | 29.45 | 30.06 | 30.31 |

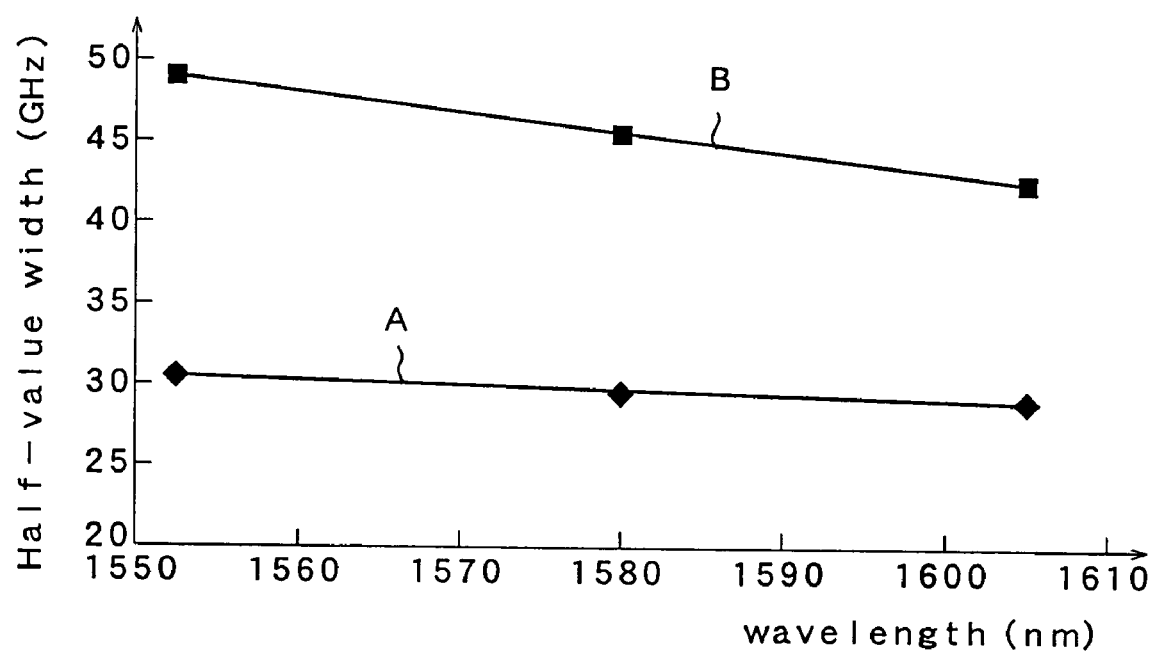
F I G. 7

TUNABLE FIBER LASER LIGHT SOURCE

BACKGROUND OF THE INVENTION

1. Field of the Invention

The present invention relates to a tunable fiber laser light source, which generates monochromatic light to periodically scan an emission wavelength thereof.

2. Discussion of the Related Art

Hitherto, as a light source of an analyzer for analyzing an object to be measured by irradiating the object with light, a light source of a wide bandwidth is used. In spectral analysis, there is widely used a method of projecting light of a wide bandwidth to an object to be measured, spatially decomposing reflection light or transmission light of the projected light to wavelength components by a grating or the like, Fourier-transforming the wavelength components to frequency components by an interferometer, and making an analysis. As a light source used in such a method, for example, a white light source, an ASE light source using an erbium doped fiber (EDF), or the like is used. In such spectral analysis, however, the intensity and density of the light from the light source with respect to the wavelength is low, and those of light which is used in spectral analysis is also low. Consequently, the light source has a drawback such that even if Fourier transformation is performed, a light signal cannot be detected due to noise, and it is difficult to carry out the analysis.

Another method uses, as the light source of the analyzer, a tunable light source for emitting light of a single spectrum of high power density which is changed in a desired bandwidth. The light source emits a strong single spectrum light beam to an object to be measured while changing the wavelength of the light beam, so that the light beam passes through the object or reflection light of the light beam is directly received by a light detecting element. In the method, the intensity and density of the optical output with respect to the wavelength of the light source is high, so that the level of detected light and a S/N ratio are sufficiently high and sufficiently high measurement precision can be realized.

Conventional tunable light source includes an external cavity-type laser and fiber ring laser. The external cavity-type laser uses a gain medium such as a semiconductor laser. An external cavity is formed between one of end faces of the semiconductor laser and an external mirror, and a tunable filter formed by a grating or the like is provided in the external resonator, thereby changing the oscillation wavelength. In such a manner, a light source of the tunable type is obtained. In the external resonator-type laser light source, the length of the external resonator is relatively short as 50 mm, and the longitudinal mode interval is wide as 30 GHz. Therefore, when the wavelength of the tunable filter is simply changed, the output becomes unstable between the longitudinal modes. For example, between modes, discontinuous mode hopping occurs, or oscillation occurs in a multimode. Therefore, in order to vary the wavelength continuously in a single mode and to, moreover, make the output stable, the length of the external cavity has to be controlled finely by using such devices as a piezo-element and a complicated control is necessary. The control accompanies a mechanical operation and is performed by making the wavelength and the length of the external cavity synchronous. Consequently, the method has a drawback that it is difficult to change the wavelength at high speed.

YAMASHITA ET AL., IEEE JOURNAL ON SELECTED TOPICS IN QUANTUM ELECTRONICS, VOL. 7, NO. 1 JANUARY/FEBRUARY 2001, PP 41~43 shows another conventional tunable light source of a ring laser using an erbium doped fiber. The tunable light source is obtained by using the erbium doped fiber (EDF) and a fiber amplifier for exciting the erbium doped fiber as a gain medium, providing a bandpass filter of a tunable type in the optical fiber loop, and changing the wavelength of the bandpass filter. In this case, the length of a resonator of the optical fiber loop can be set to be long such as 30 m, so that the interval between longitudinal mode can be narrowed. Consequently, without changing the length of the resonator, the influence of mode hopping can be eliminated. Thus, although it is, strictly, not single mode oscillation but only by changing the wavelength to be selected of the bandpass filter, virtually continuously wavelength change can be achieved.

When a tunable light source is used as a light source for the analyzer, it is necessary to change a wavelength at high speed and to narrow a width of an oscillation spectrum. Therefore, a corresponding characteristic is demanded for a bandpass filter. In the optical coherent tomography (OCT), for example, when the high-speed wavelength scanning can be utilized, a dynamic analysis can be performed to a high-speed image processing, bloodstream observation, variation of an oxygen saturation concentration, and the like, wherein such an analyzer is desired. However, a tunable laser light source capable of performing the high-speed scanning in such a manner as to follow an image display frame rate has not been available so far.

In the conventional filter techniques, however, it is difficult to obtain both high-speed wavelength sweep and a high Q value at the same time. For example, a tunable filter using an acoustooptic effect has a drawback such that, due to an insufficient suppression ratio at wavelengths other than the transmission wavelength, stable oscillation cannot be performed. In the case of forming a Fabry-Perot etalon by using a piezo-element as a bandpass filter, the wavelength sweep speed is as low as a few Hz or less and the case has a problem of hysteresis. In the case of using a grating for the bandpass filter, there are drawbacks such that adjustment of the optical axis is difficult and the cost is high. Further, in the case of using an optical interference filter as the bandpass filter, there are drawbacks such that when light is passed through the filter only once, the Q value of the filter is low and the spectrum cannot be narrowed so much.

SUMMARY OF THE INVENTION

The present invention has been achieved to solve such drawbacks and its object is to provide a wavelength tunable fiber laser light source capable of scanning wavelength of the a light source in a narrow bandwidth at high speed.

In order to achieve the above object, a wavelength tunable fiber laser light source of the present invention comprises: an optical fiber which serves as an optical path of a laser oscillation; a gain medium which is connected to said optical fiber and has a gain with respect to an oscillation wavelength; and a tunable optical filter which is connected to said optical fiber and continuously changes a bandpass wavelength, wherein said tunable optical filter includes: an optical beam deflector which periodically changes a reflection angle of an optical beam obtained from said optical fiber within a certain range; and a diffraction grating which inputs light deflected in said optical beam deflector and reflects light of a selected wavelength variable in accordance with an incident angle in a same direction as the incident angle.

According to the present invention, an optical fiber is used as a light path for laser oscillation to thereby extend a length of the light path and change an oscillation wavelength by means of a tunable optical filter. In the tunable filter, an optical beam deflector deflects light and inputs the light to a diffraction grating. The diffraction grating is used as a filter, which changes the wavelength in accordance with an incident angle, and serves to reflect the light in a same direction as the incident light. According to the foregoing constitution, the tunable filter constitutes a part of the light path, so that the oscillation wavelength can be determined in response to a selected wavelength. Then, the incident angle with respect to the diffraction grating is continuously changed and the wavelength selected by the tunable filter is continuously changed to thereby change the oscillation wavelength. The light source can scan the wavelength at high speed when the optical beam deflector defects at sufficiently high speed.

BRIEF DESCRIPTION OF THE DRAWINGS

FIG. 6 is a table showing an angle variation and a wavelength variation;

FIG. 7 is a graph showing a variation of a half-value width relative to a wavelength depending on presence/absence of the beam expander;

DESCRIPTION OF THE PREFERRED EMBODIMENTS

First Embodiment

Figure 1:
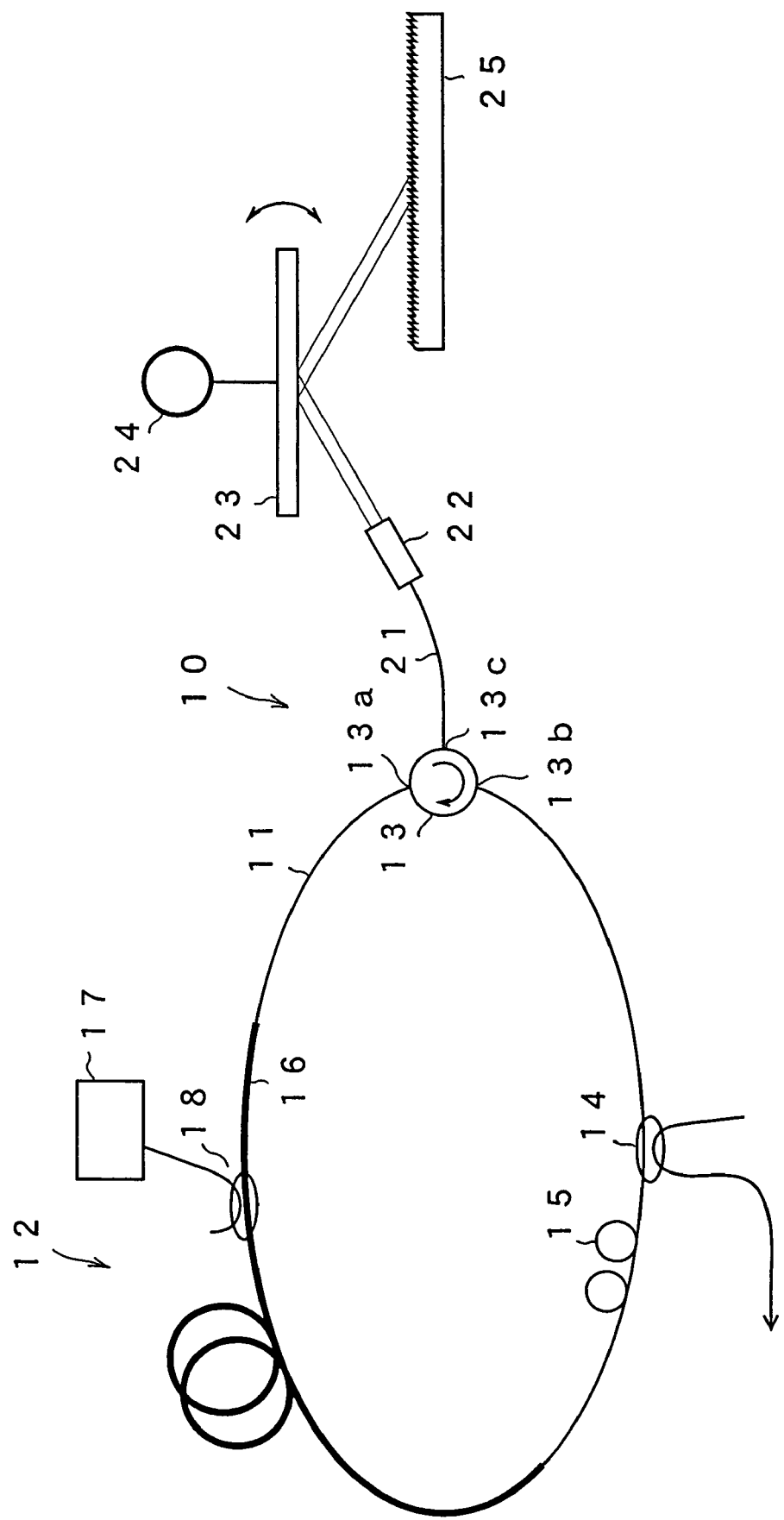
FIG. 1 is a schematic view illustrating a tunable fiber laser light source according to a first embodiment of the present invention.

FIG. 1 is a schematic view showing the configuration of a tunable fiber laser light source according to a first embodiment of the present invention. A tunable fiber laser light source 10 of this embodiment forms a loop by including an optical fiber 11. In a part of the loop, a gain medium 12, an optical circulator 13, an optical coupler 14 and a polarization controller 15 are provided. The gain medium 12 has an erbium doped fiber 16 provided in a part of the optical fiber loop and doped with erbium ions ($Er^{3+}$), a semiconductor laser 17 for exciting the fiber for emitting pump light to the erbium doped fiber 16, and a WDM coupler 18. The wavelength bandwidth of the gain can be adjusted by selecting a material with which the erbium doped fiber is doped. The optical fiber loop has a length of, for example, 30 to 50 m. The semiconductor laser 17 for exciting has a wavelength of, for example, 1480 nm or 980 nm and amplifies light passing through the erbium doped fiber 16. The optical circulator 13 regulates the direction of light passing through the optical fiber 11 to the arrow direction as shown in the figure. Specifically, input terminals 13a and 13b of the optical circulator 13 are connected to the optical fiber loop and incident light from the input terminal 13a is emitted from a terminal 13c of the optical circulator 13. Incident light from the terminal 13c of the optical circulator 13 is emitted from the terminal 13b. The incident light from the terminal 13b is emitted from the terminal 13a. The optical coupler 14 extracts a part of light of the optical fiber loop, and the polarization controller 15 regulates the polarization state of light passing through the optical fiber loop to a predetermined state.

The terminal 13c of the optical circulator 13 is connected to a collimate lens 22 via an optical fiber 21 as shown in FIG. 1. The collimate lens 22 collimates light from the optical fiber 21 into a parallel light and is provided with a mirror 23 having a plane shape on an optical axis thereof. The mirror 23 is rotated within a certain range of angles by means of a galvanometer 24 as shown in the figure. The light reflected in the mirror 23 is inputted to a diffraction grating 25. The diffraction grating 25 is a grating provided with a sectional surface having a saw-tooth waveform consecutively formed thereon at a constant pitch. A first embodiment of the present invention provides a constitution that incident light returns in an incident direction through a same light path when an incident direction is changed by a Littrow arrangement. An incident angle selects a wavelength to be selected. The wavelength to be selected is set in, for example, a range of 1550 to 1600 nm in the present embodiment. The mirror 23 and the galvanometer 24 constitute an optical beam deflector which periodically changes an angle of an optical beam within a certain range. The optical beam deflector and the diffraction grating 25 constitute the wavelength-variable filter.

The Littrow arrangement will be described. When the incident angle of the optical beam with respect to the diffraction grating is γ and a reflection angle is δ, diffracted light is obtained by the following expression.

$$\Lambda(\sin\gamma + \sin\delta) = k\lambda \quad (1)$$

Herein, k is an order and takes values of 0, ±1, ±2 ... There are Littrow and Littmann arrangements in the diffracted light. In the Littrow arrangement, angles of −1st order diffracted light and incident light are equal. Therefore, when $\gamma=\delta_{-1}$ in the expression (1), based on the expression (1), the wavelength of the diffracted light is determined by the following expression.

$$\lambda = 2\Lambda \sin \gamma \qquad (2)$$

Herein, $\Lambda$ is a pitch (μm) of the grating, that is, an inverse number of the number of grating lines a (lines/mm) per unit length. The angles of the incident light and reflected light are not equal in the Littmann arrangement.

It is necessary to select, for a length of an optical fiber loop, such a length as to include a plurality of vertical modes in a full width at half maximum of a bandpass filter by means of the diffraction grating. The number of the vertical modes is preferably at least 10, more preferably at least 100, in fact, the more, the more preferable. However, it is necessary to extend the optical fiber in order to provide more vertical modes, which necessitates the use of an optical fiber having a length of several to tens of meters in practical use.

Figure 2A:
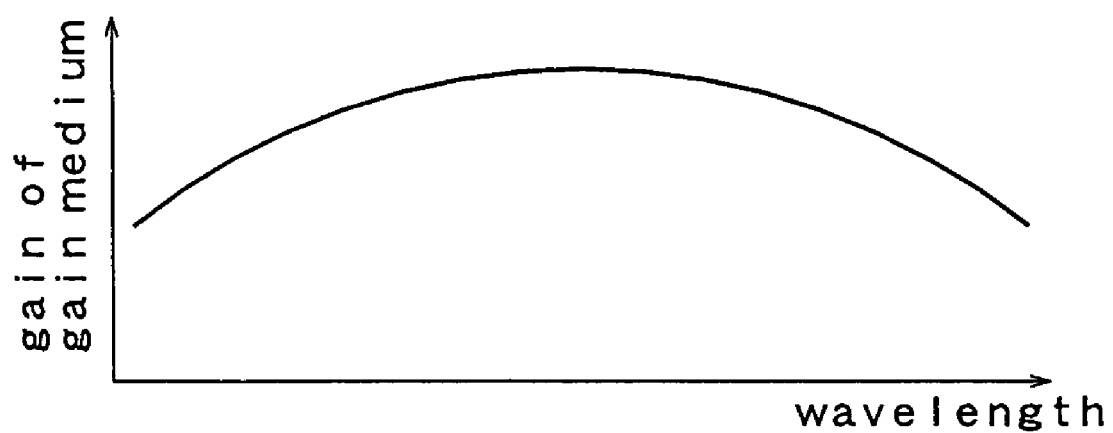
FIGS. 2A to 2D are graphs respectively showing a gain of a gain medium, an oscillation mode, a bandpass filter and an oscillation output in the optical fiber laser light source according to the first embodiment.
Figure 2B:
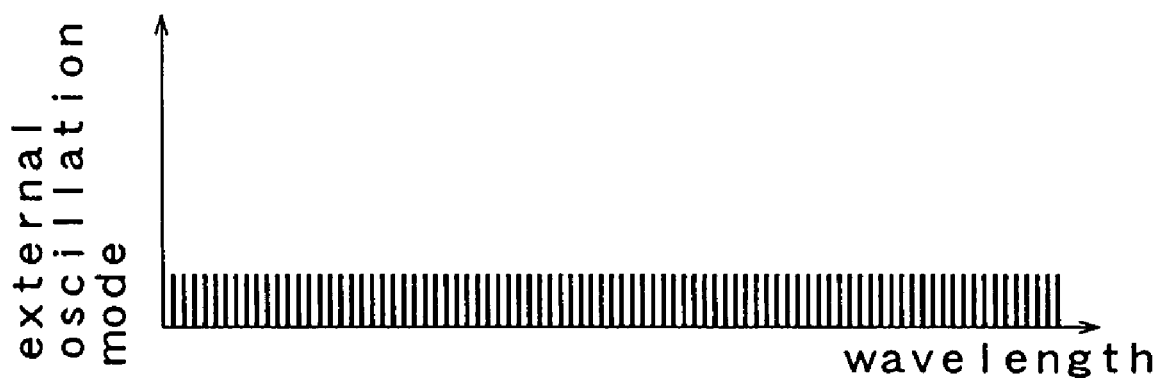
Figure 2C:
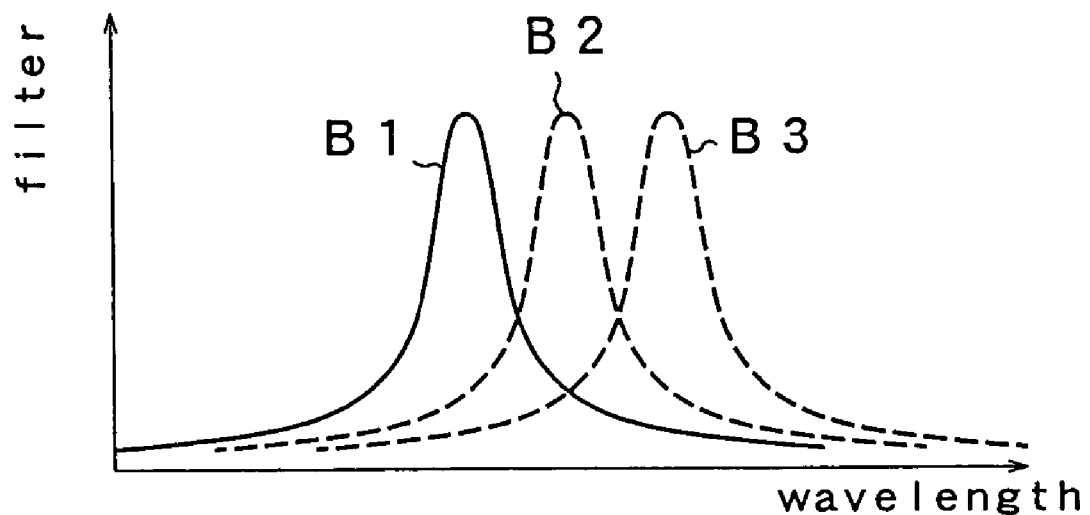
Figure 2D:
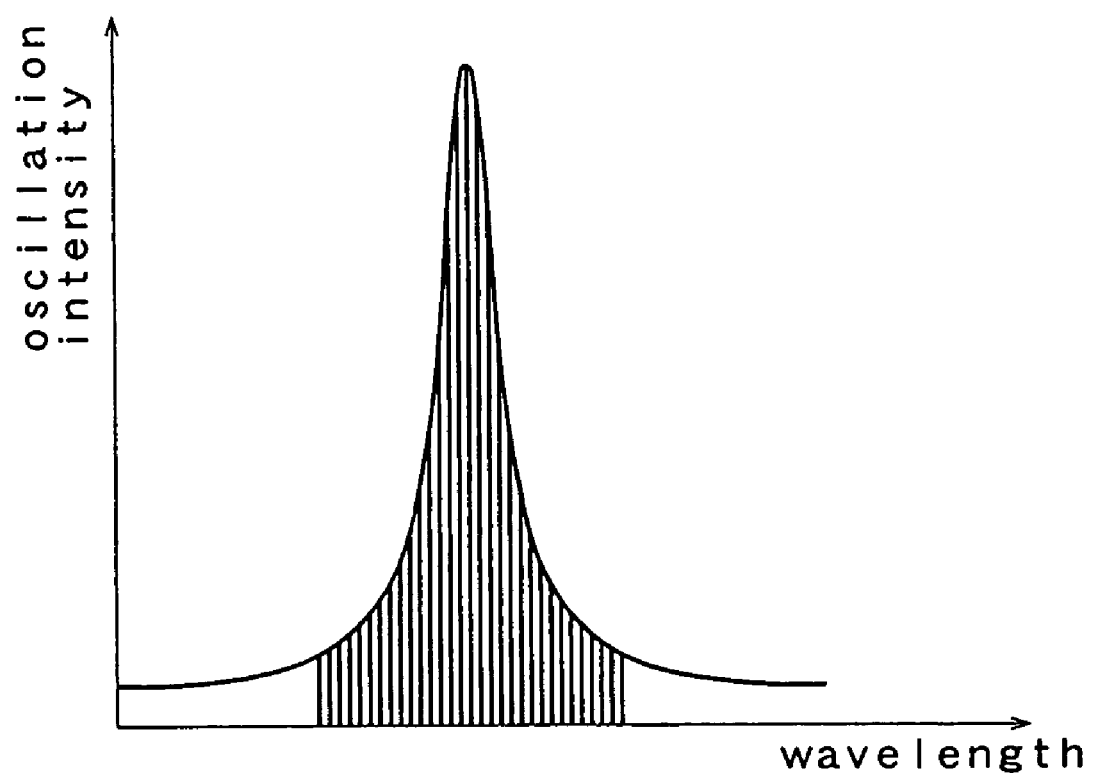

Next, an operation according to the present embodiment will be described, a semiconductor laser 17 for excitation according to the present embodiment is driven, and an optical fiber loop is pumped via a WDM coupler 18. FIG. 2A shows a gain of a gain medium 12. Thus, the light added through a terminal 13a by the operation of the optical circulator 13 is inputted to the optical fiber 21 through the terminal 13c and, then, is collimated into parallel light by the collimate lens 22. Then, the light reflected at an angle determined by a rotation angle of the mirror 23 is added to the diffraction grating 25. The reflected light selected by the Littrow arrangement of the diffraction grating 25 is directly reflected in the same direction and, then, is added to the collimate lens 22 via the mirror 23. Further, the reflected light is added to the optical fiber loop by the optical circulator 13 via the collimate lens 22. A polarization controller 15 adjusts a polarization of the light transmitting through the optical fiber loop in a predetermined direction. FIG. 2B shows an external cavity vertical mode determined in accordance with an optical length decided by the length of the optical fiber loop and a refractive index of the optical fiber. For example, when the optical length is 30 m, intervals of the vertical modes becomes approximately 10 MHz. FIG. 2C shows a characteristic B1 of the diffraction grating 25. The light is oscillated in a multiple-mode manner with a plurality of vertical modes included, as shown in FIG. 2D, at the wavelength selected by the diffraction grating 25. The oscillation wavelength is, for example, 1550 nm. A part of the laser light thus oscillated in the optical fiber loop, for example, the light equivalent to 90% of the laser light is retrieved via the optical coupler 14. An optical signal of the multi-mode oscillation raises a problem when used as a light of optical wavelength division multiplexing communication. The optical signal, however, is acceptable as long as a spectral line width (to be strict, half-value width of an envelope of the spectrum at the time of the multi-mode oscillation) is sufficiently narrower than a resolution of a subject to be measured in the case of a spectral analysis, optical fiber sensing, evaluation of optical components. As a length of an optical fiber 11 is selected such a length that a plurality of modes, preferably at least 10 modes, more preferably at least 100 modes can stand in a full width at half maximum of the optical filter.

Figure 3:
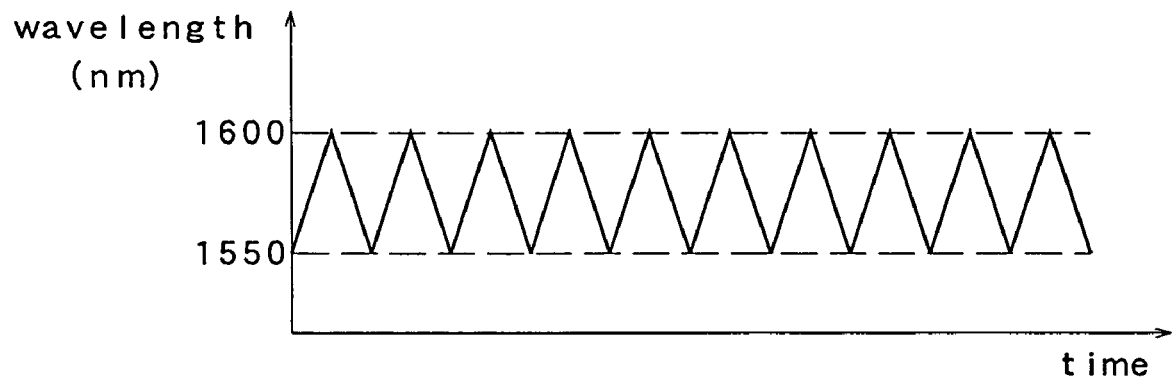
FIG. 3 is a graph showing a temporal variation of an oscillation wavelength according to the first embodiment.

The mirror 23 is then rotated by mean of the galvanometer 24. Thus, the incident angle with respect to the diffraction grating 25 is changed in FIG. 3. Consequently, the selected wavelength continuously changes as shown in B1, B2 and B3 of FIG. 2C in this order. Therefore, the oscillation wavelength can be changed as shown in FIG. 3 by rotating the mirror 23.

The oscillation according to the present embodiment is an oscillation in the multiple-mode manner as shown in FIG. 2D. Because the intervals between the vertical modes are quite narrow as shown in FIG. 2B, the oscillation mode is continuously shifted in the envelope manner when the wavelength is changed. The wavelength can be thus continuously changed without undergoing mode hopping and creating any unstable state of an output and wavelength associated with the mode hopping, which is seen in a conventional semiconductor laser of an external cavity type for a single-mode oscillation.

Second Embodiment

Figure 4:
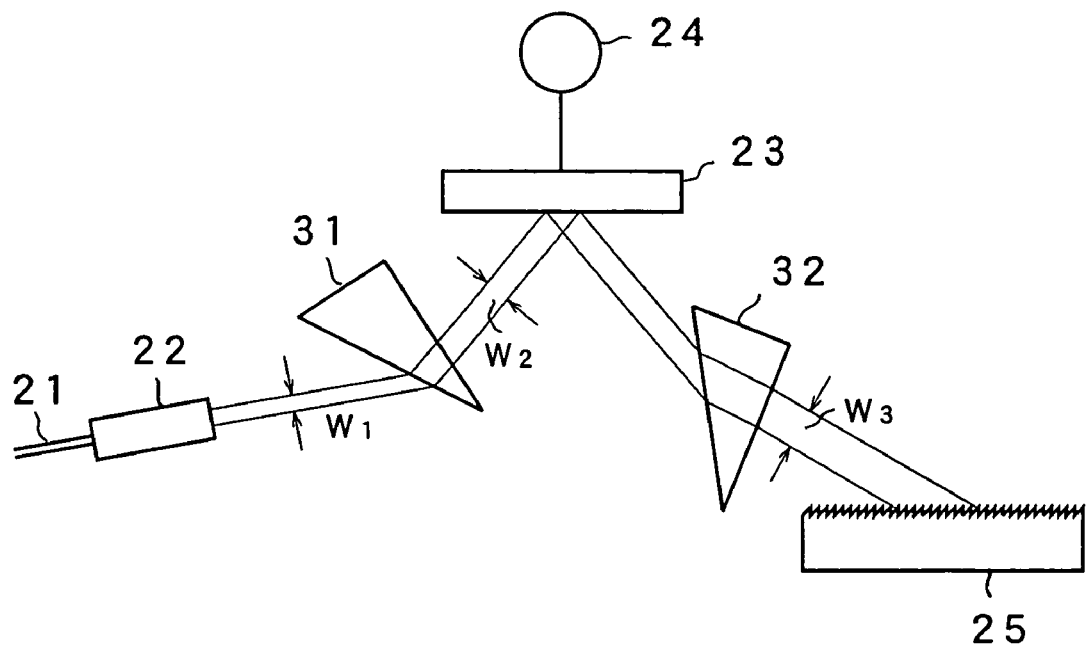
FIG. 4 is a schematic view illustrating a tunable optical filter in a tunable fiber laser light source according to a second embodiment of the present invention.

Next, a second embodiment of the present invention will be described. There is no difference between the present embodiment and the first embodiment in terms of the optical fiber loop, and the structure from the circulator 13 to the optical fiber 21 and collimate lens 22. In the present embodiment, an optical beam diameter of the light emitted from the collimate lens 22 is expended as shown in FIG. 4. When a beam diameter of an optical beam from the collimate lens 22 is $W_1$, the optical beam diameter is enlarged to $W_2$ by a beam expander 31 having a prism shape as shown in FIG. 4. The light reflected in the mirror 23, the optical beam diameter of which is further enlarged to $W_3$ by a beam expander 32, is added to the diffraction grating 25. The optical beam diameter of the incident light with respect to the diffraction grating 25 can be thus enlarged.

Figure 5:
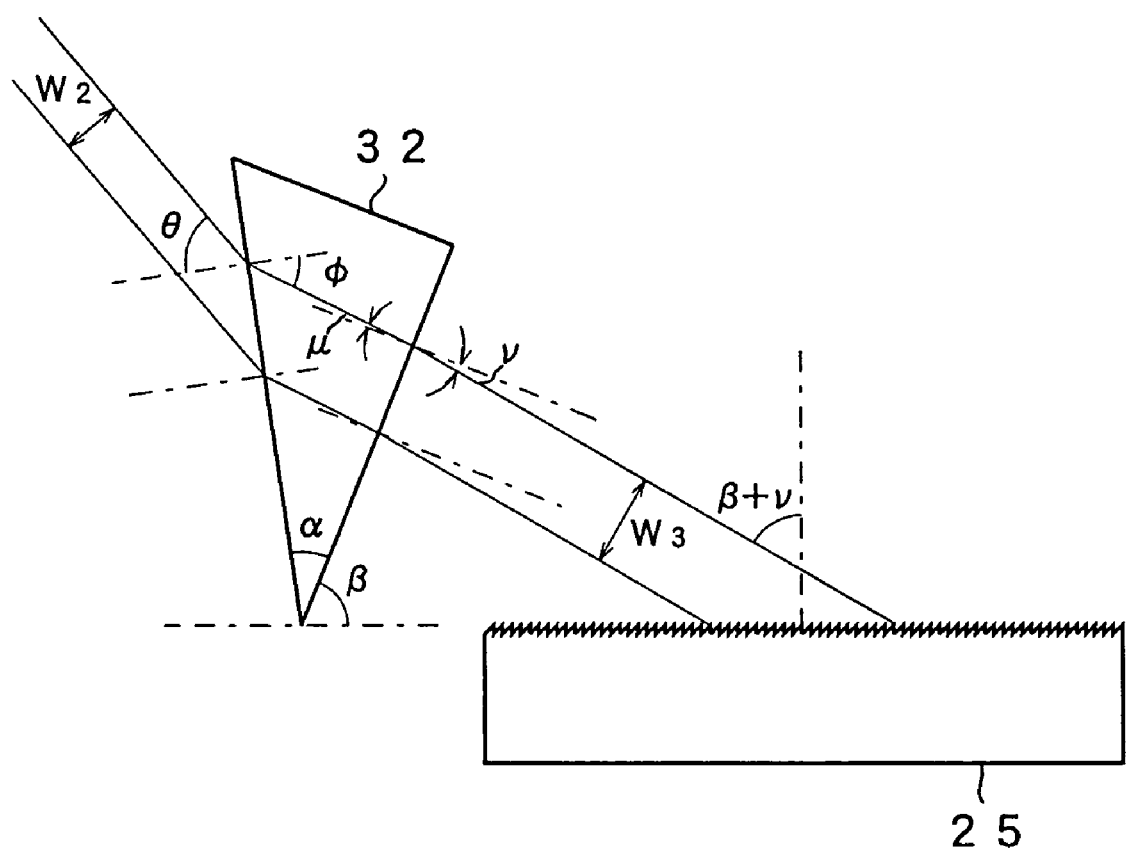
FIG. 5 is an enlarged view of a beam expander 32 and a diffraction grating 25.

FIG. 5 is an enlarged view of the beam expander 32 and the diffraction grating 25, wherein an incident angle and a refraction angle with respect to a first surface of the beam expander 32 are respectively $\theta$ and $\phi$, and an incident angle and a refraction angle with respect to a second surface of the beam expander 32 are respectively $\nu$ and $\mu$. An apex angle of a prism of the beam expander 32 is $\alpha$, and the prism is disposed at an angle position of $\beta$ relative to the diffraction grating 25. In this case, the incident angle with respect to the diffraction grating 25 is $\beta+\nu$ because of the refraction shown in the figure. A wavelength $\lambda$ selected by the diffraction grating 25 is represented by the following expression.

$$\lambda = 2\Lambda \sin(\beta+\nu) \qquad (3)$$

Herein, $\Lambda$ is a pitch (μm) of the diffraction grating and an inverse number of a constant (lines/mm) of a diffraction grating constant $\alpha$. A bandwidth in Full-Width-Half-Maximum (FWHM) $\Delta\lambda$ of the wavelength selected by the diffraction grating is obtained by the following expression.

$$\Delta\lambda = \lambda^2 / \{2\pi W \tan(\beta+\nu)\} \qquad (4)$$

Herein, W is an optical beam diameter of the light added to the diffraction grating 25, and ($\beta+\nu$) is an incident angle with respect to the diffraction grating. As is clear from the expression (3), the selected wavelength is longer as the incident angle is larger, while the small incident angle results in short wavelength. As shown in FIG. 5, when the incident angle is larger, the optical beam diameter projected on the surface of the diffraction grating is also larger. Therefore, when it is assumed that the $\lambda^2$ is substantially constant, the bandwidth $\Delta\lambda$ is wider as the wavelength is shorter.

In order for the bandwidth to be constant, the optical beam diameter W of the incident light is changed in accordance with the wavelength. The beam expander 31 serves to enlarge an original optical beam diameter $W_1$ of the incident light to $W_2$. The beam expander 32 serves to enlarge the optical beam diameter $W_2$ obtained via the mirror 23 to $W_3$. When the enlarged optical beam diameter $W_3$ is provided for the above expression (4) as a replacement, the half-value width is determined. The optical beam diameter $W_3$ obtained by the beam expander 32 is given from the following expression when an enlargement rate is $M_2$.

$$W_3 = M_2 W_2 \quad (5)$$

The enlargement rate $M_2$ is obtained from the following expression.

$$M_2 = (\cos \varphi \cdot \cos \nu)/(\cos \theta \cdot \cos \mu) \quad (6)$$

The beam expander 31 also enlarges the beam diameter in the same manner, thereby the original optical beam diameter $W_1$ is eventually enlarged to $W_3$.

FIG. 6 is a table showing angle variation and wavelength variation. FIG. 7 is a graph, which is drawn up based on FIG. 6, showing a variation of the half-value width (line segment A) relative to the wavelength when the beam expander 32 is used and a variation of the half-value width (line segment B) relative to the wavelength when the optical beam is directly inputted to the diffraction grating via the mirror 23 without using the beam expander 32. In the graph, the bandwidth is denoted by $\Delta f$ (GHz). When the beam expander is used to thereby appropriately set the angle, the bandwidth can be constantly maintained irrespective of the selected wavelength as shown in the figure.

Third Embodiment

Figure 8:
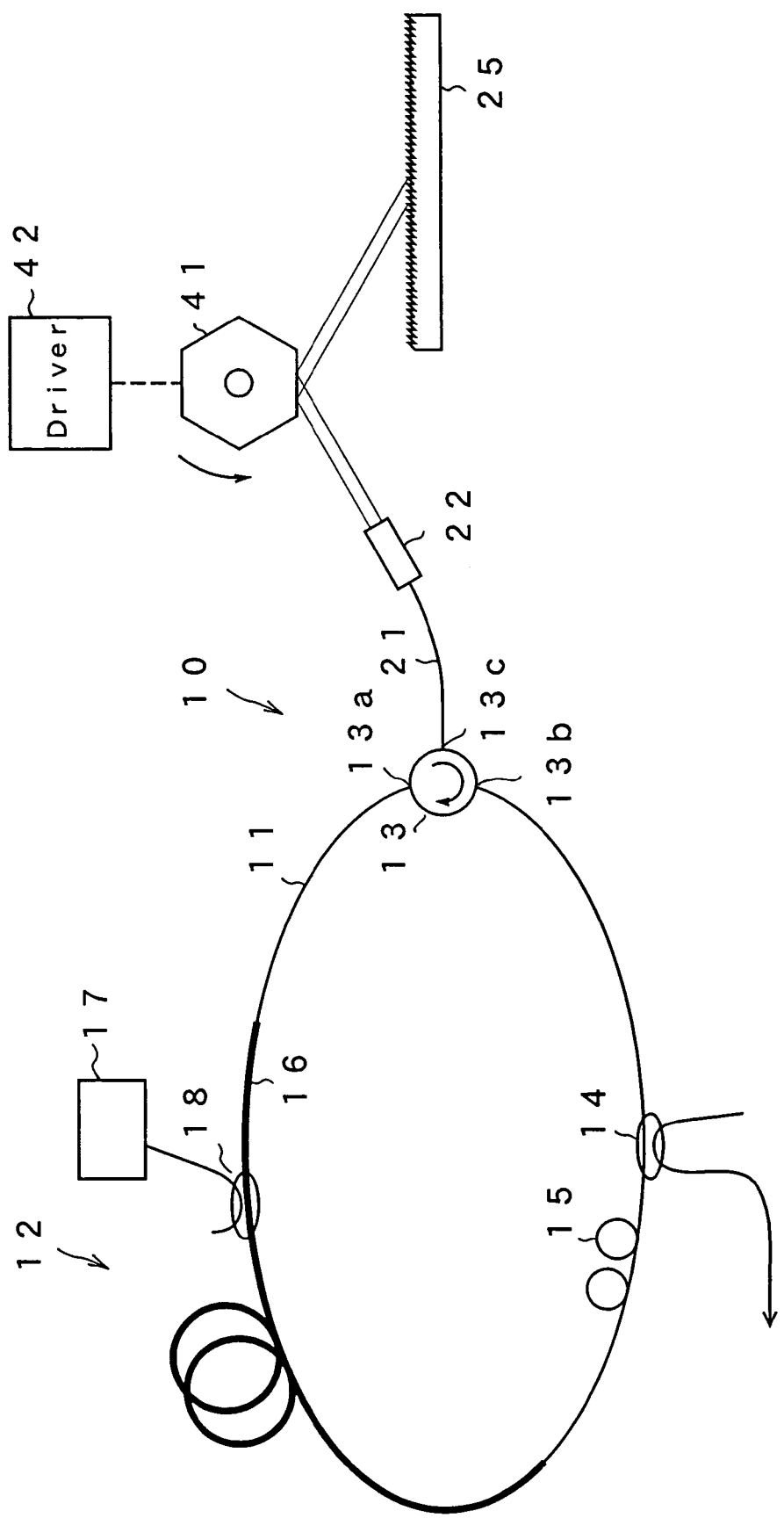
FIG. 8 is a schematic view illustrating a tunable fiber laser light source according to a third embodiment of the present invention.

FIG. 8 illustrates a tunable fiber laser light source according to a third embodiment of the present invention. In the present embodiment, the beam expander is used to thereby enlarge the optical beam diameter, and a polygon mirror is used in place of the mirror and the galvanometer. A polygon mirror 41 is rotated on an axis vertical to a paper surface as shown in the figure so as to change the angle of the parallel light within a range shown in the figure and reflect the light. The rest of the constitution is the same as in the first embodiment. In this case, when the polygon mirror 41 is rotated by a driver 42, the selected wavelength can be changed, for example, at a scanning speed of a few KHz within the range of 50 nm. When a rotational speed of the polygon mirror 41 is 30,000 rpm and the number of reflection facets of the polygon mirror 41 is 12, for example, the oscillation wavelength of the fiber laser light source can be changed at the scanning speed of 15.4 KHz. In the present embodiment, the oscillation wavelength is changed in a saw-tooth waveform.

Fourth Embodiment

Figure 9:
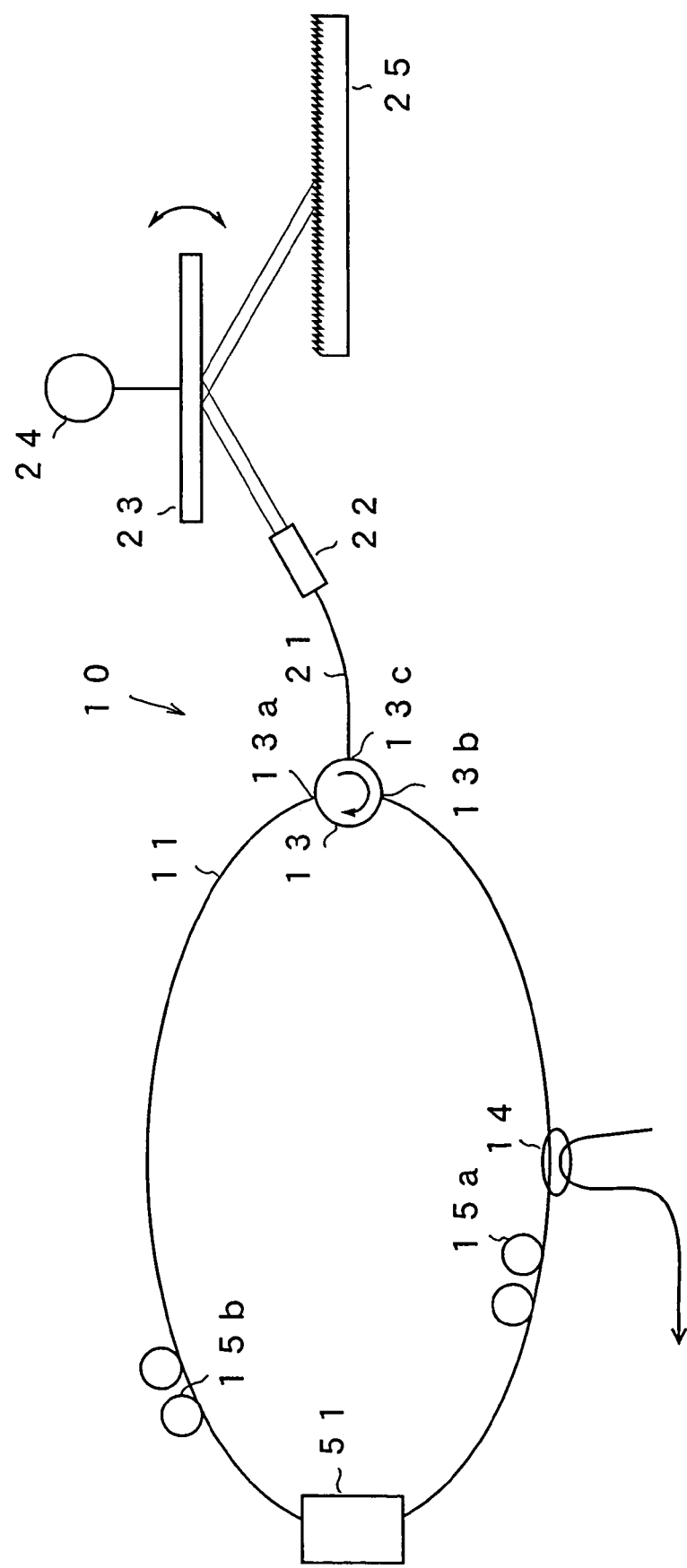
FIG. 9 is a schematic view illustrating a tunable fiber laser light source according to a fourth embodiment of the present invention.

FIG. 9 illustrates a tunable fiber laser light source according to a fourth embodiment of the present invention. In the present embodiment, a semiconductor optical amplifier (SOA) 51 is used as the gain medium in part of the optical fiber loop. The fiber loop is formed only by means of the regular optical fiber 11. Further, polarization controllers 15a and 15b are inserted into the fiber loop. The rest of the constitution is the same as in the first embodiment. When the gain of FIG. 2A is obtained and the loop is formed with the optical fiber connected to both ends thereof according to the present embodiment, the external oscillation mode shown in FIG. 2B can be obtained. Further, in the same manner as in the first embodiment, the optical fiber 21, collimate lens 22, mirror 23 and diffraction grating 25 are connected via the optical circulator 13. In the manner, the fiber laser oscillates can be obtained at the wavelength in response to the incident angle with respect to the diffraction grating 25 as in the above-mentioned embodiment. Then, the oscillation wavelength can be changed at high speed by rotating the mirror 23. In the present embodiment, the bandwidth can be reduced by changing the width of the optical beam in accordance with the incident angle by means of the beam expander.

Fifth Embodiment

Figure 10:
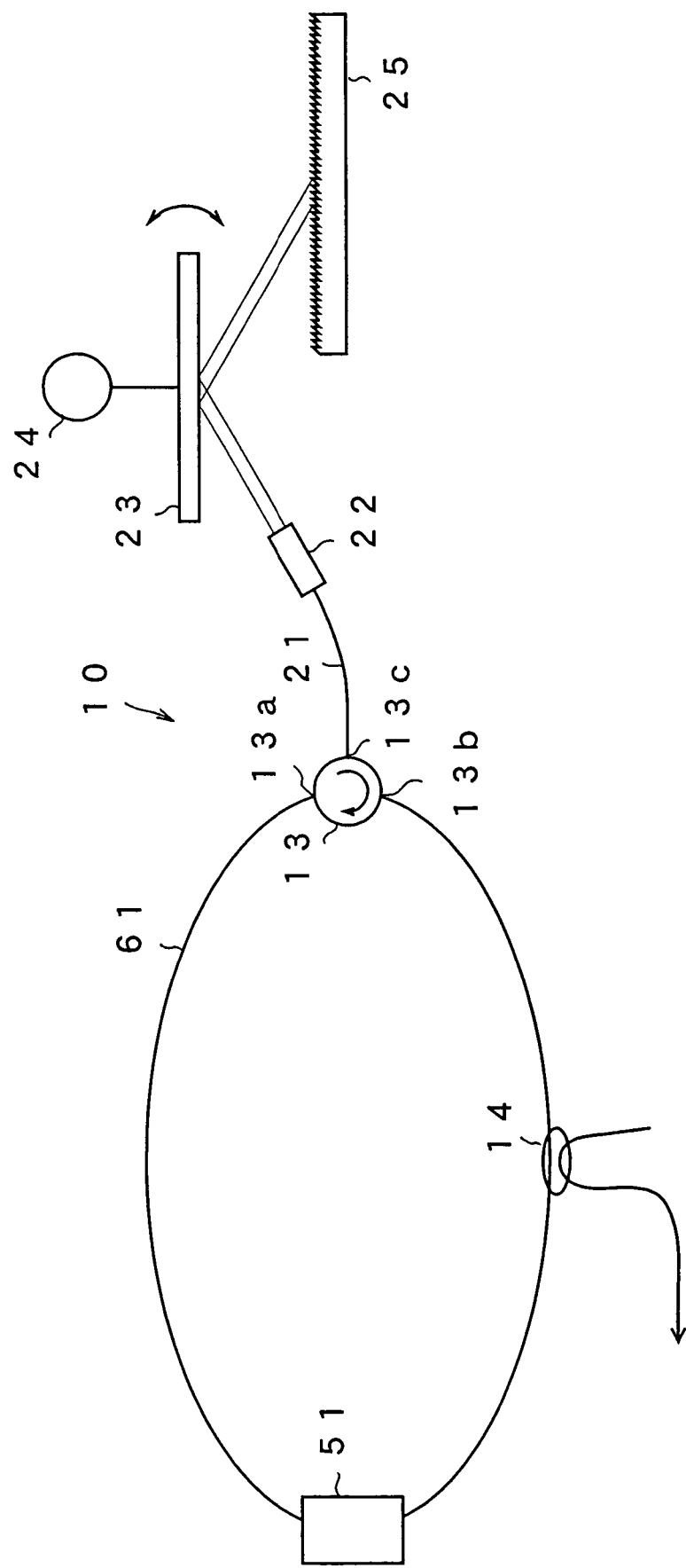
FIG. 10 is a schematic view illustrating a tunable fiber laser light source according to a fifth embodiment of the present invention.

FIG. 10 illustrates a tunable fiber laser light source according to a fifth embodiment of the present invention. In the present embodiment, an optical fiber 61 of a polarization maintaining type is used for the optical fiber loop to thereby form a loop of the fiber laser light source. As in the fourth embodiment, the semiconductor optical amplifier 51 is used as the gain medium in the present embodiment. Further, the optical circulator 13 and the optical coupler 14 are also used in the same manner as in the fourth embodiment. In the present embodiment, a polarization state of the light circulated in the loop and oscillated is constant in a predetermined direction because the optical fiber 61 is the polarization maintaining type fiber (PMF). The rest of the constitution is the same as in the mentioned embodiment, wherein a same effect can be obtained in a relatively simple constitution.

Sixth Embodiment

Figure 11:
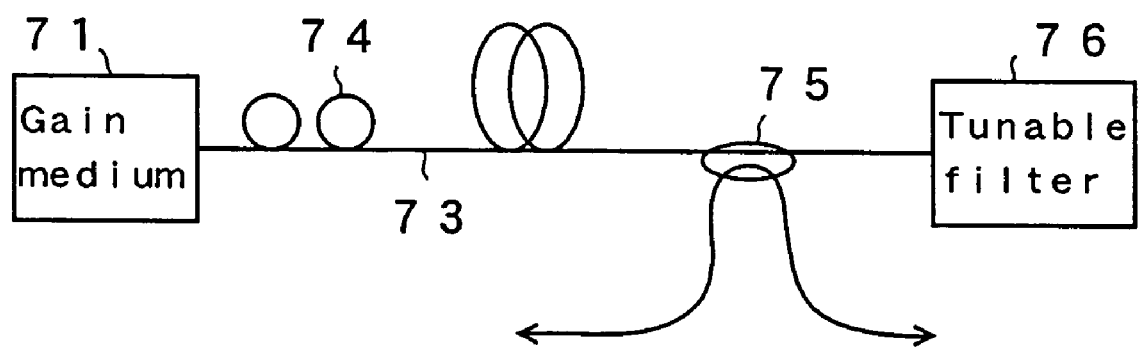
FIG. 11 is a schematic view illustrating a tunable fiber laser light source according to a sixth embodiment of the present invention.
Figure 12:
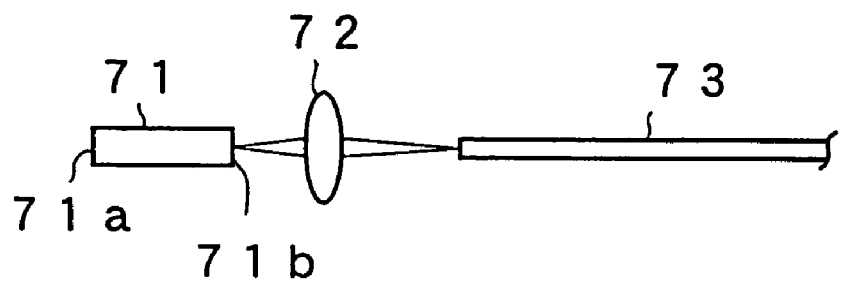
FIG. 12 is a detail illustration of a gain medium according to the sixth embodiment.

Next, a sixth embodiment of the present invention will be described referring to FIGS. 11 and 12. In the present embodiment, the optical fiber does not have the loop shape, and the gain medium, optical fiber and tunable optical filter unit are used to constitute an optical resonator. A gain medium 71 may be the semiconductor optical amplifier (SOA), Fabry-Perot semiconductor laser (FPLD), super luminescent laser diode (SLD) or the like as shown in FIG. 12. One facet 71a of the gain medium 71 is formed as a high-reflection film, for example, a reflective coating having a reflectivity of approximately 80 to 100%, while the other facet 71b is formed as a anti-reflective (AR) coating. The light transmitting through the facet 71b is connected to an optical fiber 73 via a collimate lens 72. A polarization controller 74 is connected to the optical fiber 73 whose the other end is provided with a tunable filter 76 according to any of the tunable filters described in the abovementioned embodiments. The tunable filter 76 is comprised of the optical beam deflector comprising the mirror 23 and galvanometer 24 or polygon mirror 41 and the diffraction grating 25. The optical fiber 73 is provided with an optical coupler 75, wherein a part of the laser beam is emitted outside. The optical fiber 73 is used to sufficiently extend the length of the optical path. It is necessary to select, for a length of the optical fiber 73, such a length as to include a plurality of vertical modes in a full width at half maximum of the diffraction grating 25. The number of the vertical modes is preferably at least 10, more preferably at least 100, in fact, the more, the more preferable. However, it is necessary to extend the optical fiber in order to provide more vertical modes, which necessitates the use of the optical fiber having a length of several to tens of meters in practical use.

Alternatively, the facet 71a of the gain medium 71 may be formed as the anti-reflective (AR) coating with a total-reflection mirror provided on an outer side thereof. In such a case, a branch mirror and the tunable filter 76 constitute a light path. Also in this case, the polarization controller 74 can be omitted when the optical fiber of the polarization maintaining is used as the optical fiber 73.

Seventh Embodiment

Figure 13:
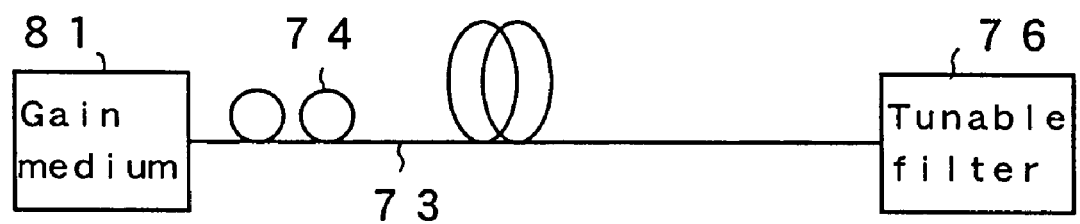
FIG. 13 is a schematic view illustrating a tunable fiber laser light source according to a seventh embodiment of the present invention.
Figure 14:
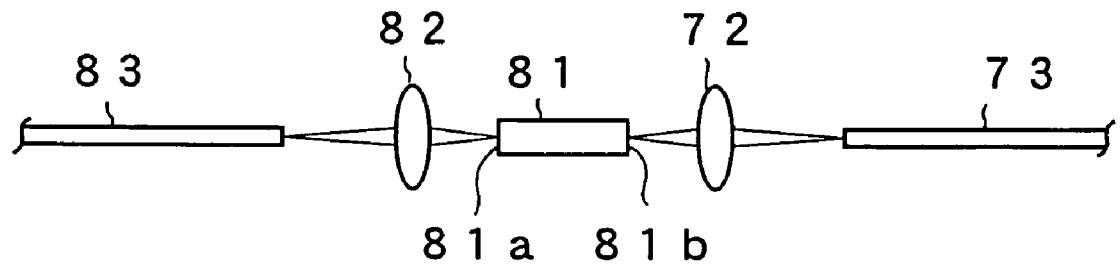
FIG. 14 is an illustration of a structure of a gain medium and a peripheral part thereof according to the seventh embodiment.

Next, a seventh embodiment of the present invention will be described referring to FIGS. 13 and 14. In the present embodiment, as shown in FIG. 14, one facet 81a of a gain medium 81 is formed as the anti-reflective (AR) coating, while the other facet 81b has a low reflectivity of approximately 10%, and oscillation output light is retrieved from the reflection facet 81a. In the facet 81a of the gain medium is provided a collimate lens 82 and an output optical fiber 83, which make it unnecessary to provide the optical coupler for retrieving the light. The rest of the constitution is the same as in the sixth embodiment.

Eighth Embodiment

Figure 15:
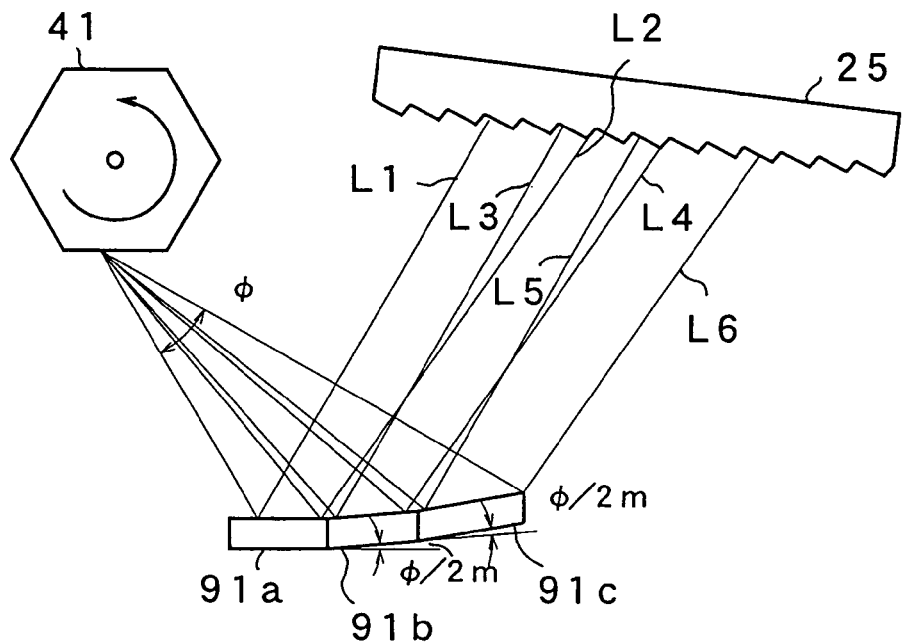
FIG. 15 is a schematic view illustrating a tunable optical filter in a tunable fiber laser light source according to an eighth embodiment of the present invention.

Next, an eighth embodiment of the present invention will be described. In the present embodiment, high speed scanning is realized by increasing the scanning speed of the optical beam deflector in which the polygon mirror or the galvanometer is used. In the following, a case of using the polygon mirror will be described. In the present embodiment, a multiple reflection facet mirror 91 having a plurality of reflection facets, as shown in FIG. 15, is disposed on an emission side of the polygon mirror 41, and the diffraction grating 25 is disposed at a reflection position of the polygon mirror 41. The rest of the constitution is the same as in the first embodiment. A range of deflection angles of the polygon mirror 41 with respect to the mirror is set to $\phi$. The reflection facets of the multiple reflection facets mirror 91 having the plurality of reflection facets (m≧2) are m=3. The respective reflection facet are a first reflection facet 91a, a second reflection facet 91b and a third reflection facet 91c as shown in the figure. The second reflection facet 91b is tilted relative to the first reflection facet 91a by $\phi/2m$, which is 5° when $\phi$ is 30°. The third reflection facet 91c is also tilted relative to the second reflection facet 91b by $\phi/2m$, that is, 5°. In the foregoing manner, the light is reflected in the reflection facet 91a in a range of 0 to $\phi/3$ with respect to the angle variation of 0 to $\phi$ of the polygon mirror 41, as shown in the figure. At that time, the reflected light changes from a straight line L1 to a straight line L2 as shown in the figure. When the optical beam enters the second reflection facet 91b, the reflected light shifts from the straight line L2 to L3. The L3 is parallel with the initial straight line L1, and the reflected light with respect to the diffraction grating 25 changes from L3 to L4 in response to the change of the deflection mirror from $\phi/3$ to $2\phi/3$. The L4 is parallel with the L2. Further, when the incident angle changes from $2\phi/3$ to $\phi$ in response to the rotation of the polygon mirror 41, the reflected light with respect to the diffraction grating 25 changes from L5 to L6. The L5 is parallel with the L1 and L3, while the L6 is parallel with the L2 and L4.

Figure 16A:
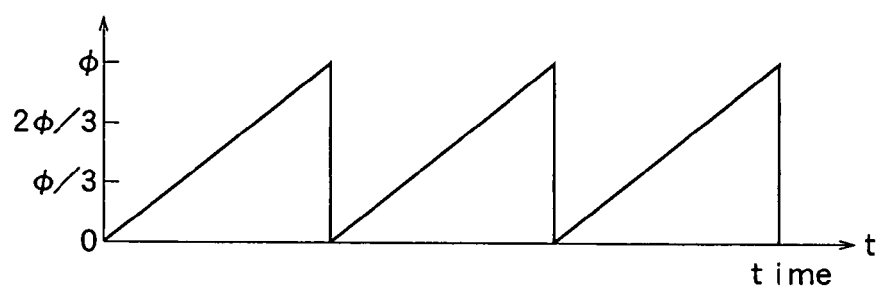
FIGS. 16A and 16B are graphs showing a relation of time and a variation of an incident angle with respect to the diffraction grating in the tunable fiber laser light source according to the eighth embodiment.
Figure 16B:
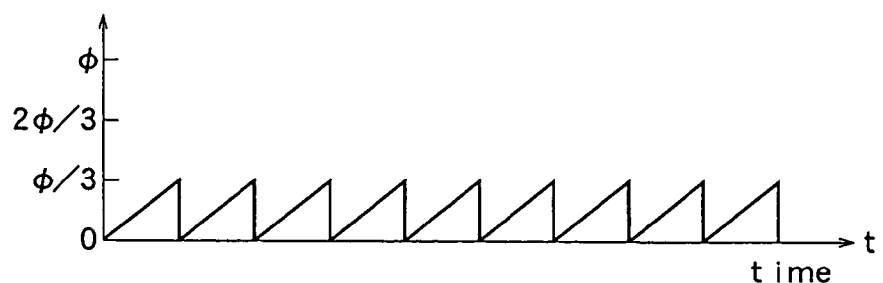

If a mirror having a flat plate shape comprising only the reflection facet 91a is used, the incident angle changes as shown in FIG. 16A and the wavelength correspondingly changes. When the three reflection facets 91a to 91c are comprised as in the present embodiment, the wavelength changes in a smaller width as shown in FIG. 16B; however, the speed of the wavelength scanning can be accelerated. Therefore, the high-speed scanning can be realized without increasing the rotation speed of the polygon mirror and the number of the mirror facets thereof. Herein, m can be an optional integer of at least 2. The multiple reflection facet mirror is disposed with an (i+1)th facet tilted relative to an (i)th facet by $\phi/2m$ when i=1 to m, so as to input the light from the optical beam deflector to (1 to m)th reflection facets per $\phi/m$ and input the reflected light to the diffraction grating. In the present embodiment, the polygon mirror is exemplified for description. However, the high-speed scanning can be realized in the same structure when the galvanometer and the mirror having the flat plate shape constitute the optical beam deflector.

In the respective embodiments described so far, the galvanometer or polygon mirror is used to constitute the optical beam deflector, however, they are not the only options. Any component capable of changing the incident angle at a high speed is acceptable.

In the present invention, the laser light source capable of changing the wavelength at a high speed can be obtained according to the relatively simple constitution by means of the diffraction grating. Therefore, the laser light source according to the present invention can be applied to an analyzer for medical application, for example, a medical imaging diagnostic device capable of a high resolution for a lower surface of epidermis. Further, the laser light source according to the present invention can be a light source of a fiber grating sensor which measures distortion, or pressure, or temperature.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese priority application No. 2004-264396 filed on Sep. 10, 2004 is hereby incorporated by reference.

What is claimed is:

1. A tunable fiber laser light source, comprising:
   an optical fiber which serves as an optical path of a laser oscillation;
   a gain medium which is connected to said optical fiber and has a gain with respect to an oscillation wavelength; and
   a tunable optical filter which is connected to said optical fiber and continuously changes a bandpass wavelength, wherein
   said tunable optical filter includes:
   an optical beam deflector which periodically changes a reflection angle of an optical beam obtained from said optical fiber within a certain range; and
   a diffraction grating which inputs light deflected in said optical beam deflector and reflects light of a selected wavelength variable in accordance with an incident angle in a same direction as the incident angle; and
   a beam expander which enlarges a beam diameter of the optical beam deflected in said optical beam deflector, and
   said beam expander increases an enlargement rate as said selected wavelength is shortened so as to keep a bandwidth of an oscillated laser light constant.

2. The tunable fiber laser light source according to claim 1, wherein
   said optical fiber is formed in a loop shape, and
   said tunable fiber laser light source further comprises an optical coupler which is connected to said optical fiber, and retrieves a part of light transmitting through said optical fiber.

3. The tunable fiber laser light source according to claim 2, wherein said gain medium is an optical fiber amplifier constituting a part of said optical fiber loop.

4. The tunable fiber laser light source according to claim 2, further comprising:
an optical circulator which has first to third terminals, wherein
said first and second terminals are connected to the optical fiber loop, said third terminal is connected to said tunable optical filter, and a direction of light inputted to the respective terminals is controlled.

5. The tunable fiber laser light source according to claim 2, wherein
said optical fiber loop includes an optical fiber of a polarization maintaining type.

6. The tunable fiber laser light source according to claim 1, wherein
said gain medium is connected to one end of said optical fiber, and said tunable optical filter is connected to the other end of said optical fiber.

7. The tunable fiber laser light source according to claim 1, wherein
said gain medium is a semiconductor optical amplifier which amplifies light.

8. The tunable fiber laser light source according to claim 1, further comprising:
an optical coupler which is connected to said optical fiber, and retrieves a part of light transmitting through said optical fiber.

9. The tunable fiber laser light source according to claim 1, further comprising:
a polarization controller which regulates a polarization state of light transmitting through the optical fiber in a constant direction in said optical fiber.

10. The tunable fiber laser light source according to claim 6, wherein
said gain medium is constituted in such a manner that one end thereof is connected to said optical fiber, and light is retrieved from the other end thereof.

11. The tunable fiber laser light source according to claim 1, wherein
said optical beam deflector of said tunable optical filter includes:
a polygon mirror which is disposed on an optical axis of light emitted from said optical fiber, and has a plurality of reflection facets for changing a reflection angle of the light by rotation; and
a driver which controls the reflection angle of the light by rotating said polygon mirror.

12. The tunable fiber laser light source according to claim 1, wherein
the optical beam deflector of said tunable optical filter includes:
a mirror which is disposed on an optical axis of light emitted from said optical fiber, and changes a reflection angle of the light by rotation; and
a galvanometer which rotates said mirror within a certain range of angles.

13. The tunable fiber laser light source according to claim 1, wherein
said beam expander includes:
a first beam expander which enlarges the beam diameter of the optical beam obtained from said optical fiber, and is disposed prior to said optical beam deflector, and
a second beam expander which enlarges the beam diameter of the optical beam obtained from said first beam expander.

14. A tunable fiber laser light source, comprising:
an optical fiber which serves as an optical path of a laser oscillation;
a gain medium which is connected to said optical fiber and has a gain with respect to an oscillation wavelength; and
a tunable optical filter which is connected to said optical fiber and continuously changes a bandpass wavelength,
wherein said tunable optical filter includes:
an optical beam deflector which periodically changes a reflection angle of an optical beam obtained from said optical fiber within a certain range; and
a diffraction grating which inputs light deflected in said optical beam deflector and reflects light of a selected wavelength variable in accordance with an incident angle in a same direction as the incident angle; and
a beam expander which enlarges a beam diameter of the optical beam deflected in said optical beam deflector, and
said beam expander increases an enlargement rate as said selected wavelength is shortened,
wherein said tunable optical filter further includes a multiple reflection facet mirror which has a plurality of reflection facets ($m \geq 2$: m is a fixed integer) between said optical beam deflector and said diffraction grating, and
said multiple reflection facet mirror is disposed in such a manner that an (i+1)th (i is a variable integer and one of 1 to m) facet thereof is tilted by $\phi/2m$ relative to an (i)th facet thereof when a range of deflection angles by said optical beam deflector is $\phi$, the light from said optical beam deflector is inputted to (1 to m)th reflection facets per $\phi/m$, and the reflected light is inputted to said diffraction grating.

\* \* \* \* \*